United States Patent [19]

Ferraro

[11] Patent Number: 5,151,782
[45] Date of Patent: Sep. 29, 1992

[54] CONTROL SYSTEM FOR SATELLITE DELIVERED PAY-PER-VIEW TELEVISION SYSTEM

[75] Inventor: Andrew G. Ferraro, Monroe, N.Y.

[73] Assignee: Reiss Media Enterprises, New York, N.Y.

[21] Appl. No.: 352,857

[22] Filed: May 17, 1989

[51] Int. Cl.⁵ ............... H04H 1/02; H04M 11/08; H04N 7/10
[52] U.S. Cl. .................... 358/86; 379/105; 455/4.1; 455/6.1
[58] Field of Search ................ 455/3, 4, 6, 2, 5; 358/85, 86, 84; 379/91, 94, 105, 201, 96, 101, 102; 380/10

[56] References Cited

U.S. PATENT DOCUMENTS

| | | | |
|---|---|---|---|
| 3,875,585 | 8/1976 | Kirtk, Jr. et al. | 178/5.1 |
| 4,118,669 | 10/1978 | Fung | 325/309 |
| 4,331,974 | 5/1982 | Cogswell et al. | 358/86 |
| 4,367,557 | 1/1983 | Stern et al. | 455/4 |
| 4,461,032 | 7/1984 | Skerlos | 455/4 |
| 4,536,791 | 8/1985 | Campbell et al. | 358/122 |
| 4,574,305 | 3/1986 | Campbell et al. | 358/86 |
| 4,613,901 | 9/1986 | Gilhousen et al. | 358/122 |
| 4,638,359 | 1/1987 | Watson | 358/147 |
| 4,638,359 | 1/1987 | Watson | 358/147 |
| 4,755,872 | 7/1988 | Bestler et al. | 358/86 |
| 4,763,191 | 8/1988 | Gordon et al. | 358/86 |
| 4,797,913 | 1/1989 | Kaplan et al. | 379/91 |
| 4,897,867 | 1/1990 | Foster et al. | 379/94 |

OTHER PUBLICATIONS

Andrew Ferraro, "Satellite Delivered Tag Change System" 1987 NCTA Technical Papers, pp. 202-204.
Bulfer A. F. et al–A Trial of a National Pay-Per-View Ordering and Billing System, 1986 NCTA Technical Papers pp. 134-139.
"Impulse Pay-Per-View"-Brochure of Science Dynamics Corporation-1986.

Primary Examiner—Reinhard J. Eisenzopf
Assistant Examiner—Chi H. Pham
Attorney, Agent, or Firm—Brumbaugh, Graves Donohue & Raymond

[57] ABSTRACT

In a system including an originating source for providing multiple television programs to one or more local cable television systems for their distribution on a pay-per-view basis, data processing equipment at the originating source stores, for each local cable system, address information, information regarding which of the programs offered by the source it wishes to carry and the times it wishes to present each to its subscribers, and information identifying its addressable head-end equipment. The data processing equipment periodically assembles and communicates to all of the local cable systems, via a satellite channel independent from the channel used for communicating program signals, a binary message which contains address and program schedule information for each of the local cable systems. Data processing equipment at the head-end of each cable system stores command information for effecting future switching of its scrambling equipment to accomplish timely delivery to its subscribers of its offered schedule of programs. Telephone equipment at the originating source capable of receiving toll-free telephone calls and providing ANI information for the caller, allows a subscriber of any of the local cable systems to order a selected program by direct dialing the toll-free number within a prescribed time period relative to the start time of the selected program. The data processing equipment at the source is programmed to determine which local cable system serves the caller and to communicate a binary message containing information signifying that an identified one of its subscribers has ordered the selected program.

20 Claims, 3 Drawing Sheets

Microfiche Appendix Included
(1 Microfiche, 15 Pages)

CONTROL SYSTEM FOR SATELLITE DELIVERED PAY-PER-VIEW TELEVISION SYSTEM

A microfiche appendix consisting of two pages is referred to herein.

BACKGROUND OF THE INVENTION

This invention relates generally to the distribution of television programming from an originating facility to one or more remote locations, and, more particularly, to a control system for automatically and remotely controlling head-end equipment at each of one or more local cable television systems.

The use of satellites for the distribution of television signals has made possible the delivery of a wide variety of news, entertainment, educational and sports programming to cable system subscribers. Examples of one type of provider of subscription programming are Home Box Office (HBO) and Showtime, the offerings of which a cable subscriber can purchase on a month-to-month basis. For delivery of such programming it is necessary to uniquely identify each channel (e.g., HBO) so as to be able to instruct the converter box in the subscriber's home which channel or channels it is authorized to descramble and which are not authorized. This is rather easily achieved by the cable operator assigning a unique tag to each of the channels it is offering and transmitting the tag data, along with other data, to the subscriber's converter box to precondition the box to descramble the ordered program signal when it arrives, usually at a specified time of the day established by the program originator.

Following the launch in November, 1985 of regularly-scheduled satellite Pay-Per-View (PPV) service, whereby a cable subscriber instead of subscribing to a particular entertainment channel on a monthly basis can with a telephone call order a single program event, such as a movie, and be charged only for what was ordered, cable systems operators discovered that their in-place hardware presented obstacles to full participation in this potentially profitable service. Specifically, the addressable hardware at the head-end of the cable system did not allow the showing of multiple events in a 24-hour period because most billing systems then in use depended on tag or address data for program identification in order properly to bill the customer. As noted above, tag levels were initially designed to work with monthly pay services.

Since a program originator or provider may offer ten showings a day of as many as four different movies, it is essential that any cable operator offering PPV be able to bill each of its subscribers for each and every showing of a movie or event ordered and watched by the subscriber. At first blush it would appear that this could be accomplished simply by changing the tag before each event, but the implementation turned out to be more difficult than would at first appear. Some cable system operators positioned an employee in the head-end facility to manually change their tags for each event. Not only was it costly to keep employees at the facility, day and night, to manually switch the tag levels, it severely limited the number of PPV movies that could be distributed per day, which, of course, limited the income of both the program originator and cable system operators.

A solution for those cable operators wishing to redistribute PPV programming distributed by a program originator, described in an article entitled "Satellite Delivered Tag Change System", by Andrew Ferraro, the applicant herein, published in 1987 NCTA Technical Papers, provided a control system for accomplishing the necessary switching at the cable operator's facility which was completely transparent to the cable operation. Message information in the form of a serial data stream encoded in accordance with the requirements of each of a multiplicity of local cable system operators is automatically generated under computer control at the originating facility and delivered by satellite to a network of cable system operators. Prior to the start of a particular Pay-Per-View event or program, the encoder equipment transmits a first message which preconditions addressable equipment at the cable system head-end to cause it to respond to a particular tag level upon later receipt of an authorization signal. The unique tag assigned to a particular program or event by an individual cable operator is stored in the originator's encoding equipment and, prior to the start of transmission of that particular scheduled program, the encoding equipment individually addresses the head-end equipment at each local cable site and downloads each cable operator's unique tag for that particular program. That is to say, the head-end equipment of all of the local cable systems is conditioned to receive the next tag value, but a tag change is not actually initiated until a subsequent message signal authorizing the change is received. The authorization signal is transmitted to the head-end of all of the cable sites simultaneously with the initiation of the program or event, thereby instructing each previously preconditioned cable head-end to insert the previously downloaded and stored tag into the composite video signal that is transmitted over its cable system. During the period between receipt of the preconditioning signal and the scheduled start time for the particular program, the head-end equipment of each system automatically distributes the tag to its individual subscribers who have ordered the program to establish descrambling authorization for those subscribers.

In this earlier system, a Commodore 64 computer installed in each cable head-end accepted the serial data stream message information and converted it to a parallel output for effecting switching operations. It was inexpensive and reliable, had the required non-volatile memory and its game cartridge port enabled a programmable ROM to be programmed with all the needed information and look-up charts.

Although this system allowed a cable operator to enter the PPV business from an operational point of view without extensive hardware upgrades and without additional manpower, because the timing of the preconditioning and authorization messages was geared to the beginning of a movie or other program event, the uneven lengths of movies frequently resulted in breaks between successive movies. This otherwise wasted break time could advantageously be used by individual cable operators to transmit short messages to its subscribers, including "teasers" such as a short segment of the movie to follow and instructions as to how the subscriber can order the program. Further, this earlier system cannot accommodate timely switching into the program distribution network of important news events, for example, carried by a satellite transponder different from the one used by the program originator.

It is, therefore, a primary object of the present invention to provide an improved control system for a satellite delivered Pay-Per-View television system which is more flexible and versatile than previously available systems for switching equipment in the head-end of each cable system of a network of such systems.

Another object of the invention is to provide a system for enabling an individual cable subscriber of any cable system on a network to order from a published schedule a desired PPV program by simply placing a timely telephone call, without voice contact, to the facilities of the program originator.

SUMMARY OF THE INVENTION

Briefly, the control system according to the invention provides the originator of PPV programming to a network of local cable television systems with two major functions: automatic controlled switching of a variety of scrambling equipment, and automatic delivery of individual subscribers' ordering information to the billing equipment of the cable operator that serves the subscriber. These functions are performed by a microprocessor controlled device installed in the head-end of a cable television system in response to control signals automatically generated at the program originator's site and delivered via satellite to the cable head-end. These functions are all controlled automatically and remotely from the program originator's facilities. Local controls are provided in the cable system head-end to permit monitoring of the operation the microprocessor controlled device and the initiation and performance of diagnostic functions.

The equipment at the program originator's facility includes a computer system, preferably a multi-tasking multi-user computer, for assembling and transmitting to the network of cable TV operators two different types of messages, one for controlling switching of scrambling equipment at the local cable sites and another for delivering subscriber ordering information to the local cable systems.

Information supplied by individual cable operators, such as which of the programs offered by the originator he wishes to carry; the times at which he wants to carry them; whether or not he wishes to utilize break times between successive programs and, if so, how; and technical specifications of his scrambling equipment, including identification of the manufacturer, is stored in computer memory. Periodically, typically hourly, the computer assembles and sends a stream of data to each cable head-end on the network which, essentially, preloads local data processing equipment with the next sixteen commands that its scrambling equipment will have to respond to.

Each local cable TV company provides its subscribers with a listing of the PPV programs it will be offering during a given period including the local time at which each will be presented, and informs it subscribers that a desired program can be ordered by dialing one of several toll-free 800 numbers within a specified "window" period straddling the start time of the desired program. For example, in order to watch a movie scheduled to start at 8:00 P.M. the subscriber would be instructed, either by printed instructions in a program listing or by instructions presented on the TV screen, to call one of the 800 numbers within a period commencing 15 minutes before the start of the movie and ending, say, 30 minutes into the movie a (i.e., "window" of forty-five minutes starting at 7:45 P.M.) and warned that unless the call is made within this period nothing will have been ordered.

The call is routed through the telephone network to the originator's facility where it is processed via Automatic Number Identification (ANI) equipment supplied by AT&T and compared with stored address information in the form of the area code and telephone exchange of each cable operator; that is to say, the first six digits of the cable operators telephone number. In response to calls received within the "window" period, the computer system determines from the caller's area code and exchange the identity of the cable system that serves the caller and then automatically assembles and communicates a binary message which includes address information which uniquely identifies the cable operator, a code indicating that the message contains an ANI message, and the calling subscriber's telephone number. Only the identified cable system receives the message, which is decoded by the local data processing equipment and routed to the cable operator's billing equipment which automatically charges the ordered program to the subscriber's account and also alerts local equipment to send an authorizing signal to the subscriber's converter box. Although it takes only about seven seconds from placement of the subscriber's call for the system to send an authorizing signal to his converter box, if a subscriber should call during the period when switching command data is being communicated, the ordering message is automatically delayed until the command message is completed.

The system thus permits end users, the individual subscribers of a network of local cable systems, to order a particular program by dialing a toll-free telephone number during a specified time period reckoned from the start time of the desired program. There is no voice communication between the subscriber and the program originator; the subscriber simply dials the 800 number and hangs up, and the system automatically handles the rest of the transaction. In essence, the ordered product is a particular television program which the customer—and the system—identifies by the time of day that it is ordered. Because of the short period required for handling each call the program originator can service a large number of subscribers, in turn serviced by a large number of CATV operators, which may be widely scattered, with only a few toll-free lines; the assignee of the present patent application, Reiss Media Enterprises, currently services in excess one million individual subscribers of sixty-five different cable television system operators with four toll-free lines.

Other objects, features and advantages of the invention, and a better understanding of its construction and operation, will be had from the following detailed description, taken in conjunction with the accompanying drawings.

DESCRIPTION OF THE PREFERRED EMBODIMENT

Figure 1:
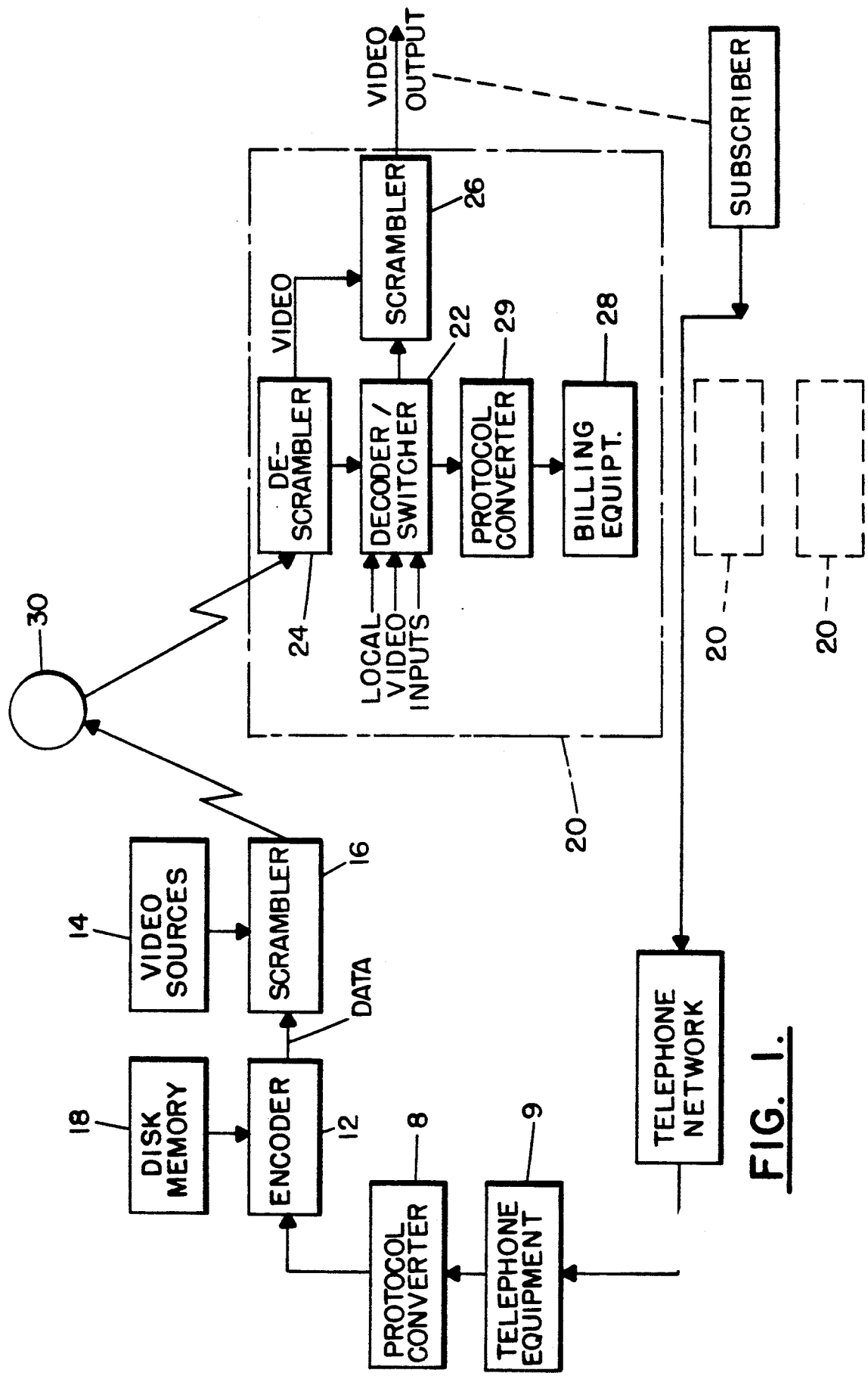
FIG. 1 is a functional block diagram of a system for the satellite delivery of television programming embodying a control system in accordance with the present invention.

FIG. 1 illustrates a television programming delivery system the originating facility 10 of which includes an encoder 12 and one or more video sources 14 and is linked to the head-end of each of one or more cable television systems 20, which may be widely scattered, each including a decoder 22. The communications link 20 for transmitting video program signals and control data from the originating facility 10 to each of the cable system head-ends is realized through the use of a satellite communications link 30.

The primary video signals to be transmitted to the network of local cable television systems, derived from one or more video sources 14, such as a VCR, are scrambled in a suitable scrambling device 16, such as the commercially available Video Cipher I, and scheduled by the encoder 12 to cause each of a plurality of programs offered during a given 24-hour period to start at a predetermined time, typically, every two hours on the hour. The program originator furnishes the schedule to each cable operator on the network with start times given in the local time of the originating facility, and each local operator, who may be separated from the originating facility by none, one or more time zones, in turn makes available to its subscribers, usually in local time, the schedule of programs he will be offering. The primary video signal is descrambled at the cable head-end using a suitable descrambler 24, which may be the commercially available Video Cipher II, and then applied, along with local video inputs if desired, to a scrambler 26, also conventional and commercially available, to produce a scrambled video output signal for distribution by the local cable system.

The encoder 12, which preferably utilizes a multi-user multi-tasking computer system and necessary peripherals, including a disk memory 18, generates control data to be transmitted to the cable systems. On an hourly basis, encoder 12 automatically assembles and sends over the satellite link 30 to each of the cable systems in the network a stream of data which essentially preloads each decoder 22 with the next sixteen switching commands that it is going to have to make. As a separate task, the encoder 12, in response to a telephone call from an individual subscriber of any of the cable systems in the network to a designated 800 number at the originators facility, and after processing of the calling pulse data in telephone equipment 9 provided by AT&T and buffering by a suitable protocol converter 8 assembles and sends a message consisting of the address of the calling subscriber's cable system, a function code which indicates that the message contains ANI information, and part of the calling subscriber's telephone number, all constituting an order message. When this message is received by the addressed cable system, it is decoded and routed to the cable operator's billing equipment 28, via a suitable protocol converter 29, if required, which automatically bills the ordered program to the calling subscriber's account.

Figure 2:
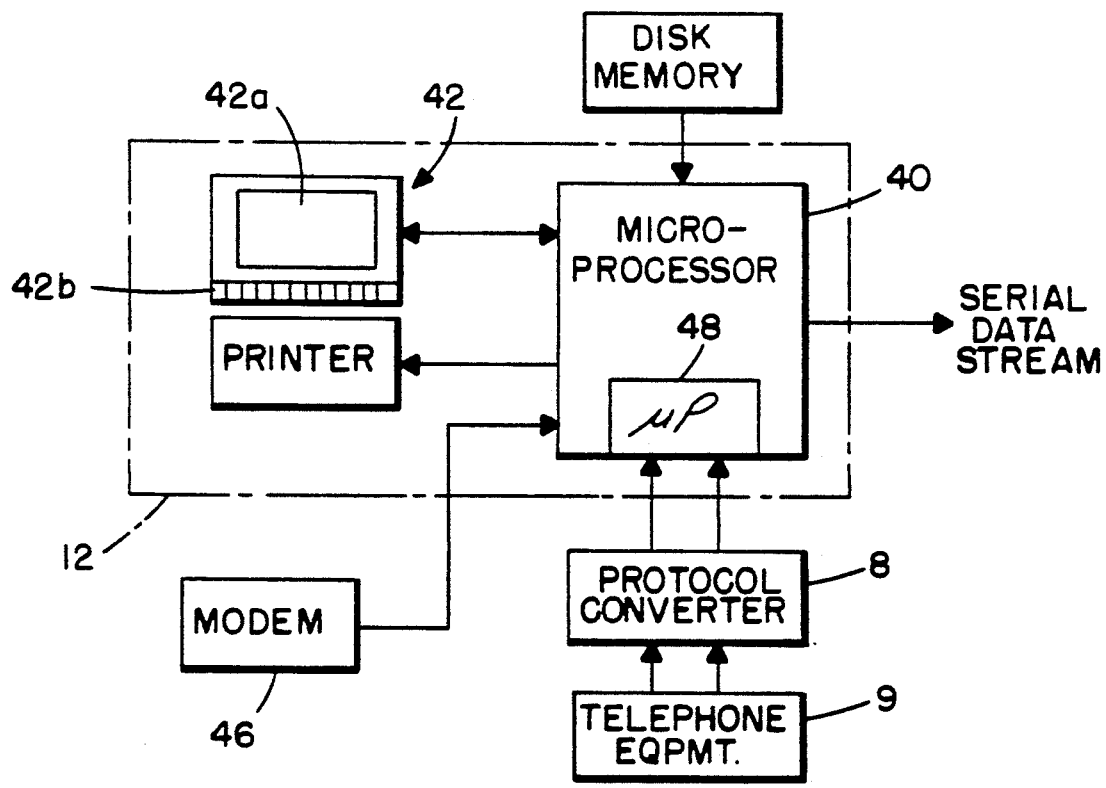
FIG. 2 is a block diagram illustrating the details of the encoder used at the originating facility in the FIG. 1 system.

Referring now to FIG. 2, the encoder 12 at the originating facility may be implemented by using the commercially available Intel 80286 microprocessor and appropriate input/output interfaces, disc memory 18, a terminal 42 having a keyboard 42a and display 42b, a printer 44 and, if desired, a modem 46 through which the microprocessor may be accessed by local telephone, as by designated personnel of the originating facility. The preferred operating system for the described computer system is "Concurrent DOS" by Digital Research, Inc. and disc memory 18 is preferably an 80 megabyte disc drive. A separate microprocessor system 48 based on the Z80 with its own memory and completely isolated from the microprocessor is mounted on a separate card and handles the incoming data stream from the telephone equipment 9. A microfiche of the printout of the program for microprocessor 40 and the Z80 microprocessor 48 is attached hereto and marked "Appendix I".

Based on information supplied by each cable operator concerning the type and manufacturer of its addressable headend equipment, including the switching protocol of its scrambling equipment, a first database is developed and stored in disk memory 18 in the form of a lookup table which has an entry for each cable system identifying the site of the system and a number of presets which uniquely describe the tier or tag levels of the equipment at that site. Generally, the scrambling equipment at the cable system head-end responds to tag levels each uniquely identified by a digital code; depending on the particular equipment used by a given cable operator, which may differ from manufacturer to manufacturer, it may have a minimum of thirty-two and a maximum of 256 different tag levels.

The first database also stores information, initially provided by the individual cable operators, concerning which of the programs being offered he wishes to carry, the times at which he wants them to be carried on his cable system, and whether he wishes to offer local programming during breaks between successive programs offerings and, if so, the equipment he intends to use to provide it. Unless the cable operator requests schedule changes, the stored information is carried over from month to month; the ending times of the movies being offered, which may change from time to time and therefore alter the length of break periods, are stored in another lookup table. The memory also stores trunk records consisting of three digits for identifying the area code and three digits for identifying the telephone exchange for each local cable system on the network.

Microprocessor 40 is programmed periodically to access the database, typically every hour on the hour, and assembles and transmits a serial data stream via the satellite channel to the head-end of each cable system on the network. The decoder in each cable system screens out information contained in the data stream except that which is unique to it; the received information is processed and essentially preloads the decoder with the next sixteen commands the head-end equipment will have to respond to in order to appropriately switch its scrambling equipment so as to deliver to its authorized subscribers, at the proper times, the programs that it had previously indicated a desire to carry. Just prior to each hourly transmission, the clock at the originating facility is synchronized with a real-time clock in each cable system head-end, and because these commands are transmitted hourly the system has a high degree of redundancy and allows each decoder, typically provided with battery backup, to be pre-programmed up to two days in advance and thus provide isolated operation for an extended period even if there should be interruptions in the generation and/or transmission of the control data stream.

The microprocessors 40 and 48 are programmed to respond to ANI data processed by the AT&T telephone equipment and to compare the first six digits of the caller's telephone number against the trunk information stored in the database to determine the identity, and from that the address of the cable system that serves the calling subscriber. In the event the first six digits of the caller's telephone number should apply to two or more different cable systems, which may sometimes be the case, the ordering message is addressed to each. The presets for the identified site or sites are read out of the database and the information assembled into a message in the form of a serial data stream of "ones" and "zeroes" which includes address information for the caller's cable system, information indicating that the message contains ANI information, and the subscriber's telephone number. The message is sent to scrambler 16 (FIG. 1) where it is time division multiplexed with the program signals then being transmitted and sent via satellite 30 to all cable systems on the network. Should a subscriber call be received while switching command data is being sent, transmission of ANI information to the local sites is automatically delayed until the command message is completed.

Figure 3:
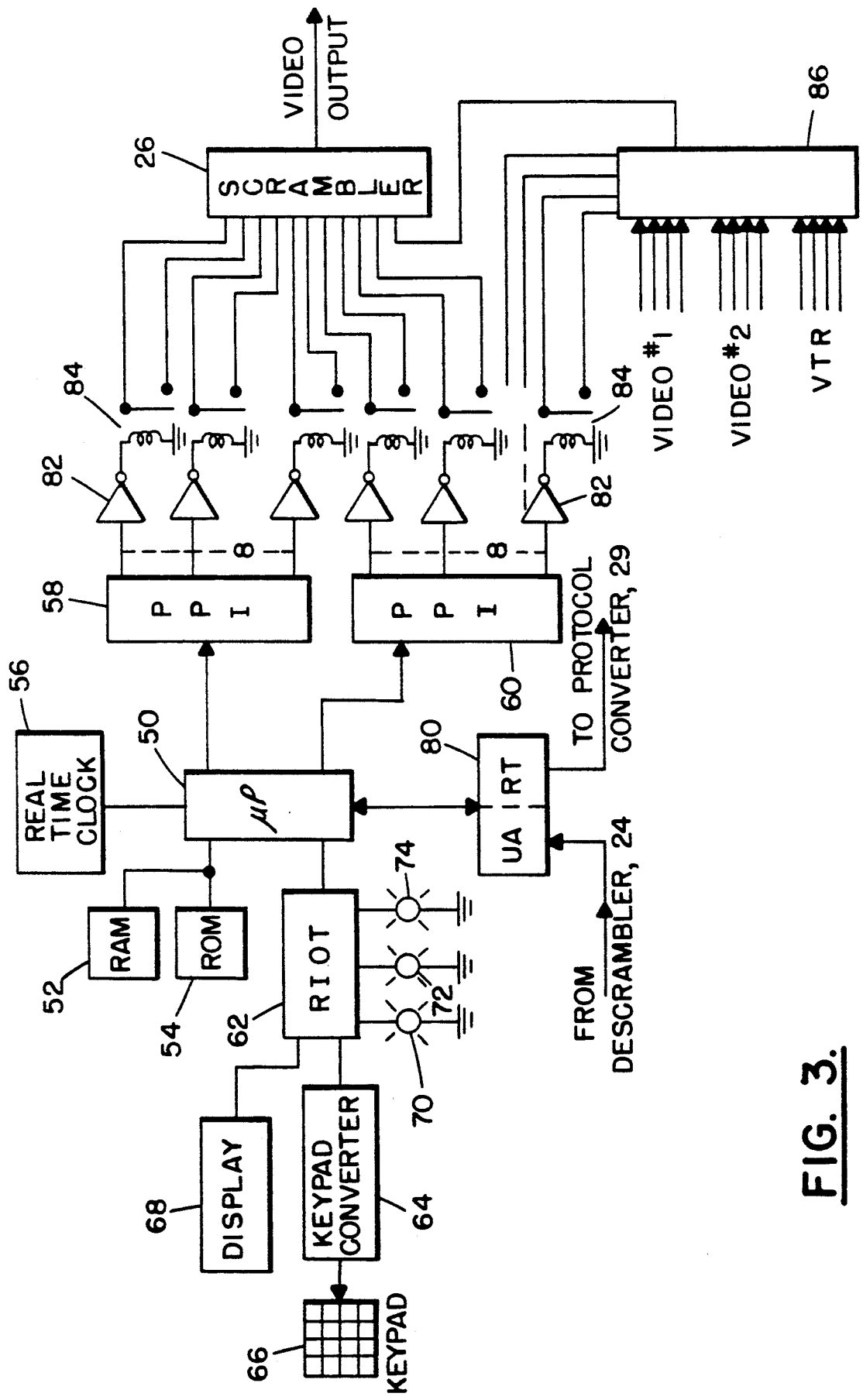
FIG. 3 is a block diagram illustrating the details of the decoder/switching device used in the receive end of the FIG. 1 system.

Referring now to FIG. 3, the heart of the decoder/switcher 22, which is marketed under the trademark "Smart Sat", is a single board microcomputer based on an Intel 8085A microprocessor 50 and appropriate random access memory (RAM) 52, read only memory (ROM) 54, a real-time clock 56, and two programmable peripheral interfaces (PPI) 58 and 60 each providing a 16-bit parallel interface. The ROM 52 may be the commercially available Intel 6116 having 8192 bytes of memory, the ROM 54, in which the computer program is stored, may be the commercially available Intel 2764 EEPROM having 2048 bytes of memory, and real time clock 56 may be the MM58167A manufactured by National Semiconductor. The PPI's 58 and 60 may be the commercially available Intel 8255A programmable peripheral interfaces, which provide a 24-bit parallel interface, of which sixteen of each are used in this application.

Another peripheral device is a device 62 labelled "RIOT", which may be the commercially available Intel 8155A RIOT (ROM, I/O, and Timer) having 256 bytes of RAM resident therein for providing stack space. The RIOT device communicates via a keyboard encoder 64, which may be the commercially available National Semiconductor 74C922 Keyboard Encoder, to drive a display 66, such as the Sharp LM152 liquid crystal display with a back light and having a 16-key keypad 66. Three LED's 70, 72 and 74, which may be red, yellow and green, respectively, are directly driven by three bytes provided by RIOT 62 to display program status.

A Universal Asynchronous Receiver Transmitter (UART) 80, such as the commercially available Intel 8251A, provides a 2-channel serial port, one channel of which is connected to the output of descrambler 24 via a conventional RS422 interface circuit (not shown) and communicates message data received from the satellite link to microprocessor 50, and the other channel is connected via a conventional RS232 interface circuit (not shown) to protocol converter 29 and couples microprocessor 50 to the billing equipment 28.

The Intel 8085A microprocessor 50 is an 8-bit device capable of addressing $2^{16}$ memory addresses and $2^8$ input/output addresses, and is programmed in Intel 8085A assembly language; a microfiche of the printout of the program is attached hereto and marked "Appendix II". Following initialization of the various hardware devices, the system enters a main polling loop, every spin of which checks the keypad 66 for activity, watches UART 80 for incoming messages, compares the time of real-time clock 56 to the time of the newest message stored in the advance command message buffer to determine whether it is time to actually change switching states. Upon receipt of an incoming message it compares the address contained in the message with the site address stored in ROM 54, and if there is a match it then examines the command byte and determines whether it is an ANI message or an "execute immediate" message; if it is an ANI message the system will reformat the data and send it back out of UART 80 into the billing equipment 28, and if it is a command message it will read the presets from the table stored in ROM 54 and program the programmable peripheral interfaces 58 and 60 which, in turn, set selected ones of a plurality of relays 84 as dictated by the tag level of the "execute immediate" data stream. Eight of the twelve output bits available on each PPI 58 and 60 are connected to a respective buffer 82, which may take the form of a Texas Instruments SN7407 inverter used as a driver, the output of which drives the coil of a respective single pole single throw (SPST) relay 84. The contact closures of each relay are brought out to respective connectors on the rear panel of the "Smart Sat" unit for connection to the local scrambler 26. Since each relay may at any instant have either an open or a closed contact, the sixteen relays provide a 32-bit parallel interface, giving the scrambler the capability of establishing thirty-two uniquely different tag levels.

To enable the originating facility to remotely control the video and/or audio programming the local cable operator may wish to offer its subscribers, the "Smart Sat" device includes an auxiliary switch 86, which take the form of a daughter board mounted on the single board microcomputer, consisting essentially of a switch having three inputs and one output. Typically, each input is a set of four signals consisting of a video input and two balanced audio inputs for providing a stereo audio channel. One of the video inputs to the auxiliary switch may be a local VTR for distributing a short pre-event ordering spot, for example, explaining to subscribers how to go about ordering the upcoming movie. When a position on keypad 66 designated "VTR" is depressed, the microprocessor switches on the control lines for the VTR, but because of the finite roll-up time of a VTR the start of play is delayed. Typically, the delay between start and play is eight seconds, which can be selected by depressing a key on keypad 66, and upon completion of the ordering spot the system automatically switches back to a scheduled program coming from the program originator, and also commands the VTR to rewind; the VTR does this automatically and recues to be ready for the next use. The three sets of local inputs are controlled by three of the thirty-two relay closures mentioned earlier via a short cable connected from auxiliary switch 86 to selected relays.

The keypad 66 and associated equipment allows the local CATV operator to monitor the "Smart Sat" system and to do local switching of tag levels and updating of real-time clock 56. Depressing any of the sixteen keys of the keypad puts the system in a diagnostic mode in which it is precluded from accepting incoming commands or executing stored commands from ROM 54.

This mode is indicated by a steadily on error light and display of the message "ENTER COMMAND" on display 68. While the unit is in the diagnostic mode the following arbitrarily numbered keys cause the indicated action:

0—resets the hardware and software to the power-on state;
1—allows local switching of tag level;
2—allows local updating of real-time clock 56;
3—allows examination of the last sixteen switches (automatic or manual) that have occurred;
4—special monitor mode;
5—set delay for switching of one of relays 84 for automatic rollup of local VTR;
D—runs tests of relays 84;
F—aborts diagnostic mode.

Figure 4:
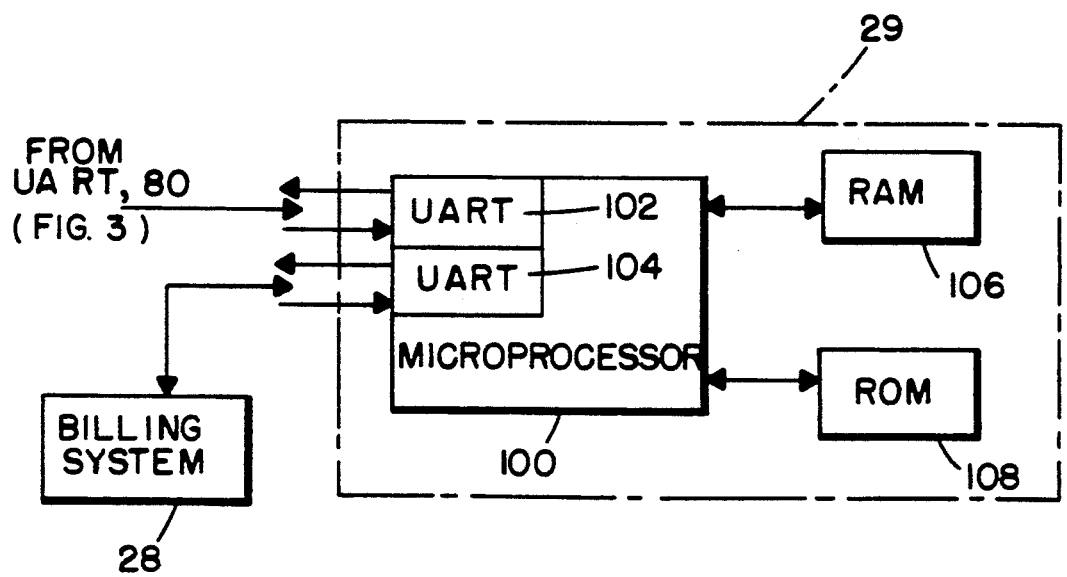
FIG. 4 is a block diagram illustrating the details of a suitable protocol converter for use with the decoder/switcher device illustrated in FIG. 3.

FIG. 4 illustrates a suitable protocol converter 29 for allowing a generic output data stream from UART 80 (FIG. 3), which contains information identifying a particular calling subscriber, to be coupled to any of a variety of different types of billing equipment 28, which automatically bills the ordered program to the subscriber's account. The converter may be the commercially available Hitachi HD64180 microprocesser which has within it two universal asynchronous receiver transmitter channels 102 and 104; 64K of dynamic RAM 106 and 2K of ROM 108 are attached to the microprocessor 100. The serial port provided by UART 102 is connected to the output of the second channel of UART 80 (FIG. 3) and the serial port provided by UART 104 connects the data stream to billing system 28, which usually takes the form of a billing computer. The function of protocol converter 29 is to buffer message data incoming from UART 80 into the large capacity RAM 106 for taking into account the fact that operating speed of typical billing systems tends to be much slower than that of the microprocessor 50, and also to convert the generic protocol from UART 80 into the protocol required by the particular billing system, typically of two general types: those requiring hand-shaking with decoder unit 22 and consequently needing additional time for exchange of messages, and those which will accept a straight dump of data from UART 80 and will instruct the microprocessor 50 when it no longer wishes to receive data. Whichever type is used by a particular CATV operator, the protocol converter is desirably used so as to allow the "Smart Sat" system to be universally applicable to all cable systems.

The "Smart Sat" microcomputer equipment shown in FIG. 3 (except for the keypad 66 and display 68) is packaged and shipped to the local cable system operator in a generic state; that is to say, with nothing stored in either RAM 52, ROM 54 nor the RAM resident in RIOT 62. After installation of the equipment in the head-end of the cable system, the encoder 12 at the originating facility transmits to the head-end all of the data the individual cable operator needs to set up his or her decoder, together with the information it supplies to all cable operators on the network, such as identification of the programming being offered for carry, the times at which the offered programs are to be carried, whether or not any breaks between successive movies are to be utilized and, if so, for what purpose, and of course information concerning the addressable equipment at the cable head-end. As was noted earlier, all of this information is organized into a look up table stored in the disc memory 18; when the identification number of the newly "hooked up" cable operator is punched into terminal 42 (FIG. 2) all of the data necessary to set up its "Smart Set" system is transmitted thereto and appropriately stored in the correct memories.

Those familiar with data processing systems will recognize that the system of the present invention may be used for remotely controlling the operation of apparatus other than cable headend equipment that is amenable to being switched in response to different tag levels.

While there has been described what is considered to be a preferred embodiment of the invention, those skilled in the art will now recognize that modifications may be made thereto without departing from the spirit of the invention, and it is intended to claim all such modifications and variations as fall within the true scope of the invention.

I claim:

1. In a system including an originating source for providing program signals according to a pre-arranged schedule to the head-end equipment of one or more local cable television systems each having one or more subscribers, apparatus for automatically controlling from the originating source scrambling equipment at the head-end of each of said one or more local cable television systems for scheduling delivery to respective subscribers of the programs provided by said originating source, said apparatus comprising:

first data processing means at said originating source including first memory means for storing for each said one or more local cable television systems: address information, information as to which of the programs offered by the originating source it wishes to receive and the times or times at which it wishes to present each program to its one or more subscribers, and information regarding the technical specifications of its addressable head-end equipment, wherein said first data processing means is programmed to periodically and automatically assemble and communicate to the head-ends of all of said local cable television systems a binary message which contains address information and desired program schedule information for each of said local cable television systems; and second data processing means at the head-end of each said one or more local cable television systems including second memory means for storing command information for effecting future switching of its scrambling equipment to accomplish delivery of its offered schedule of programs to its subscribers and programmed to accept only that portion of said message that is addressed to it and to update said stored command information.

2. Apparatus as defined by claim 1, wherein the address information stored in said first memory means for each local cable television system comprises area code and telephone exchange information for the site of its head-end equipment.

3. Apparatus as defined by claim 1, wherein said first data processing means communicates said assembled message to said local cable television systems by means of a telecommunications channel which is independent of the channel by which program signals are communicated.

4. Apparatus according to claim 3, wherein said telecommunications channel includes a satellite.

5. Apparatus as defined by claim 2, wherein said apparatus includes means at the originating source for receiving toll-free telephone calls and providing to said first data processing means Automatic Number Identification (ANI) information concerning a caller, and wherein said first data processing means is programmed to compare received ANI information with said stored area code and telephone exchange information for determining which of said local television systems serves said caller and, provided the telephone call is received within a prescribed time period relative to the scheduled start time of an offered program, automatically assembles and communicates to the head-end of the local cable television system determined to serve the caller a message which contains ANI information signifying that an identified one of its subscribers has ordered a particular program.

6. Apparatus as defined by claim 5, wherein said second data processing means is programmed to determine whether a received message is addressed to it and, if so, to determine whether ANI information contained therein matches telephone number information identifying one of its subscribers and, if so, to provide subscriber identification information for automated billing of an ordered program to the caller's account.

7. A system for providing automated ordering of television programs by a subscriber of a local cable television system by direct toll-free telephone dialing an originating source which provides television programs according to a predetermined schedule to a network of cable television systems including said subscriber's local cable television system for delivery, in turn, to respective subscribers according to a predetermined local schedule with each program identified by the time of day at which it is scheduled to start, said originating source including means for receiving toll-free telephone calls and providing Automatic Number Identification (ANI) information for callers, said system comprising:

data processing means at said originating source interconnected with said means for receiving telephone calls to receive ANI information regarding a caller and wherein the data processing means is programmed to compare area code and telephone exchange information contained in said ANI information with stored area code and telephone exchange information identifying the site of each said one or more local cable television systems for determining which of said local cable television systems serves the caller and, provided the telephone call is received within a prescribed time period relative to the scheduled start of an offered program, to automatically assemble and communicate to the local cable television system determined to serve the caller a message signal containing information signifying that an identified one of its subscribers has ordered a particular program.

8. The system as defined by claim 7, wherein said data processing means communicates said assembled message to the local cable television systems by means of a telecommunications channel that is independent from the channel by which television programs are delivered.

9. The system as defined by claim 8, wherein said telecommunications channel includes a satellite.

10. A method for providing automated customer ordering of products by direct toll-free telephone dialing a source which provides products to one or more distributors for distribution, in turn, to respective customers, which source includes telephone equipment for receiving toll-free calls and providing Automatic Number Identification (ANI) information for identifying a caller, comprising the steps of:

identifying said products each by the time of day at which it can be ordered, providing data processing means at said source and programming the data processing means to compare ANI information contained in a received toll-free telephone call with area code and telephone exchange information stored in said data processing means which provides address information for each said one or more distributors for determining which of said regional distributors serves the caller and, provided the telephone call is received within a prescribed time period relative to the time of day at which one of said products can be ordered, to automatically assemble and communicate to the distributor determined to serve the caller a message signal containing information signifying that an identified one of its customers has ordered a particular product.

11. The method as defined by claim 10, wherein the data processing means communicates the assembled message to the distributor by means of a satellite telecommunications channel.

12. The method as defined by claim 10, wherein the products comprise a plurality of television programs to be provided according to a predetermined schedule of start times for each, wherein each of said distributors is a local cable television system which distributes to respective subscribers one or more of said television programs according to its schedule of start times, and wherein the customer is a subscriber of one of said local cable television systems.

13. In a system including an originating source for providing multiple television programs according to a predetermined schedule of start times for each to scrambling equipment at the head-end of one or more local cable television systems each having at least one subscriber wherein said originating source includes data processing means having memory means for storing for each said local cable television system address information, pre-arranged information regarding which of the programs to be provided it wishes to receive and the time or times of day it wishes to present each program to its subscribers, and information which identifies its addressable head-end equipment and being programmed automatically to periodically communicate to said local cable television systems a binary message which contains address information and program schedule information for each of said local cable television systems based on said pre-arranged information, apparatus for use at the head-end of each of said local cable television system comprising:

data processing means including means for storing command information necessary to effect future switching of its scrambling equipment to accomplish timely delivery to its subscribers of its offered schedule of programs and programmed to accept that portion of said message that is addressed to it and to update said stored command information.

14. Apparatus as defined by claim 13, wherein said data processing means is timed by real-time clock means synchronized with clock means at said originating source, and wherein said apparatus further comprises means for converting tag information contained in a serial data stream from said data processing means to a multi-bit parallel interface with said scrambling equipment for establishing tag levels.

15. Apparatus as defined by claim 13, wherein said apparatus further comprises keyboard means interconnected with said data processing means for enabling local switching of tag levels and local monitoring of said data processing means.

16. Apparatus according to claim 15, wherein said apparatus further comprises means controllable by said converting means for coupling a local source of program signals, instead of program signals from said originating source, to said scrambling equipment.

17. A system for providing automated ordering of television programs offered and distributed by a program originating source by a subscriber of a local cable television system by direct toll-free dialing said originating source, comprising:

an originating source which provides television programs according to a pre-arranged schedule to a network of one or more local cable television systems including said subscriber's local cable television system;

first data processing means at said originating source including first memory means for storing for each said one or more local cable television systems the following information: area code and telephone exchange, which of the programs offered by the originating source it wishes to receive and the time or times at which it wishes to present each to one or more subscriber, and the technical specifications of its addressable head-end scrambling equipment, and wherein said first data processing means is programmed to automatically periodically assemble and communicate to the head-ends of all local cable television systems of said network a binary message which contains area code and telephone exchange information and desired program schedule information for each local cable television system;

second data processing means at the head-end of each local cable television system of said network including second memory means for storing command information for effecting future switching of its scrambling equipment to achieve delivery to its subscribers of its offered schedule of programs, wherein each second data processing means is programmed to accept only that portion of said binary message that is addressed to it for updating said stored command information; and means at said originating source for receiving toll-free telephone calls and providing to said first data processing means Automatic Number Identification (ANI) information concerning a caller for comparison with the area code and telephone exchange information stored in said first memory to determine which local cable television system of said network serves said caller and, if the telephone call is received within a prescribed time period relative to the scheduled start time of an offered program, to automatically assembly and communicate to the head-end of the local cable television determined to serve the caller a message which contains ANI information signifying that one of its subscribers has ordered a particular program.

18. Apparatus as defined by claim 17, wherein said periodically assembled messages are communicated by satellite to said local cable television systems on a telecommunications channel which is independent of the channel on which said originating source distributes program signals.

19. Apparatus as defined by claim 17, wherein the second data processing means at the head-end of each local cable television system of said network is programmed to determine whether a received message is addressed to it and, if so, to determine whether ANI information contained therein matches telephone number information stored in said second memory means which identifies one of its subscribers and, if so, to provide subscriber identification information for automated billing of an ordered program to the caller's account.

20. A method for providing automated subscriber ordering of pay-per-view television programs by direct toll-free dialing an originating source which provides according to a pre-arranged schedule of start times a plurality of offered pay-per-view television programs to one or more local cable television systems for distribution, in turn, to respective subscribers, which originating source includes equipment for receiving toll-free telephone calls and for providing Automatic Number Identification (ANI) information for identifying a calling subscriber, comprising the steps of:

identifying each of said programs by its scheduled start time, receiving at said originating source a toll-free telephone call from a subscriber of one of said local cable television systems and noting the time of day the call is received, comparing ANI information contained in the received subscriber call with stored area code and telephone exchange information for each of said local cable television systems for determining which cable television system serves the calling subscriber, and if the subscriber's call is received within a prescribed time period relative to the start time of an offered pay-per-view program, assembling and communicating to the local cable television system determined to serve the calling subscriber information signifying that one of its subscribers has ordered a particular program.

* * * * *

UNITED STATES PATENT AND TRADEMARK OFFICE
CERTIFICATE OF CORRECTION

PATENT NO. : 5,151,782
DATED : September 29, 1992
INVENTOR(S) : Ferraro

It is certified that error appears in the above-indentified patent and that said Letters Patent is hereby corrected as shown below:

Col. 1, line 13, "system" should read --system for a satellite delivered pay-per-view television system--. Col. 14, line 4, "television" should read --television system--.

Signed and Sealed this

Ninth Day of November, 1993

Attest:

BRUCE LEHMAN

Attesting Officer

Commissioner of Patents and Trademarks